United States Patent
Olofsson et al.

(10) Patent No.: US 11,008,933 B2
(45) Date of Patent: *May 18, 2021

(54) FOUR STROKE INTERNAL COMBUSTION ENGINE

(71) Applicant: Scania CV AB, Södertälje (SE)

(72) Inventors: Eric Olofsson, Stockholm (SE); Daniel Norling, Huddinge (SE); Michael Vallinder, Stockholm (SE); Jonas Aspfors, Nykvarn (SE); Johan Linderyd, Rönninge (SE); Henrik Höglund, Gnesta (SE); Per-Inge Larsson, Vagnhärad (SE); Andreas Dahl, Nyköping (SE); Martin Stenberg, Bromma (SE)

(73) Assignee: Scania CV AB, Södertälje (SE)

( * ) Notice: Subject to any disclaimer, the term of this patent is extended or adjusted under 35 U.S.C. 154(b) by 308 days.

This patent is subject to a terminal disclaimer.

(21) Appl. No.: 15/772,441

(22) PCT Filed: Oct. 5, 2016

(86) PCT No.: PCT/SE2016/050944
§ 371 (c)(1),
(2) Date: Apr. 30, 2018

(87) PCT Pub. No.: WO2017/078589
PCT Pub. Date: May 11, 2017

(65) Prior Publication Data
US 2018/0320579 A1    Nov. 8, 2018

(30) Foreign Application Priority Data
Nov. 3, 2015 (SE) .................................. 1551415-1

(51) Int. Cl.
*F02B 27/04*  (2006.01)
*F02B 75/04*  (2006.01)
(Continued)

(52) U.S. Cl.
CPC .............. *F02B 27/04* (2013.01); *F02B 37/02* (2013.01); *F02B 37/025* (2013.01); *F02B 75/02* (2013.01);
(Continued)

(58) Field of Classification Search
CPC .. F02B 37/02; F02B 37/025; F02B 2075/027; F02B 27/04
See application file for complete search history.

(56) References Cited

U.S. PATENT DOCUMENTS

| 4,535,592 A | 8/1985 | Zinsmeyer |
| 5,067,452 A | 11/1991 | Elsbett et al. |

(Continued)

FOREIGN PATENT DOCUMENTS

| DE | 2022089 A1 | 11/1971 |
| DE | 2062222 A1 | 7/1972 |

(Continued)

OTHER PUBLICATIONS

International Search Report for PCT/SE2016/050944 dated Dec. 12, 2016.

(Continued)

*Primary Examiner* — Thomas Sweet
(74) *Attorney, Agent, or Firm* — Moore & Van Allen PLLC; W. Kevin Ransom

(57) ABSTRACT

A four stroke internal combustion engine is disclosed comprising at least one cylinder arrangement, an exhaust conduit, and at least one turbine. The cylinder arrangement comprises an exhaust port arrangement configured to open and close an exhaust flow area, $A_{CYL}$. The cylinder arrangement (Continued)

ment has a maximum volume, $V_{MAX}$. The exhaust conduit extends between the exhaust flow area, $A_{CYL}$, and a turbine wheel inlet area, $A_{TIN}$, of the turbine and has an exhaust conduit volume, $V_{EXH}$ that is ≤0.5 times the maximum volume, $V_{MAX}$. The exhaust port arrangement is configured to expose the exhaust flow area, $A_{CYL}$, at a size of at least 0.22 times the maximum volume, $V_{MAX}$, when a piston of the cylinder arrangement is at the bottom dead centre, BDC.

9 Claims, 5 Drawing Sheets

(51) Int. Cl.
  *F02B 75/02* (2006.01)
  *F02C 6/12* (2006.01)
  *F02B 37/02* (2006.01)
  *F02F 1/42* (2006.01)
  *F02F 7/00* (2006.01)

(52) U.S. Cl.
  CPC .............. *F02C 6/12* (2013.01); *F02F 1/4264* (2013.01); *F02F 7/006* (2013.01); *F02B 2075/027* (2013.01); *F05D 2220/40* (2013.01); *Y02T 10/12* (2013.01)

(56) References Cited

U.S. PATENT DOCUMENTS

| | | | |
|---|---|---|---|
| 5,819,693 | A | 10/1998 | Curtil |
| 6,694,735 | B2 | 2/2004 | Sumser et al. |
| 10,036,308 | B2 | 7/2018 | Hofmann |
| 2019/0153906 | A1* | 5/2019 | Olofsson ............. F01L 13/0047 |

FOREIGN PATENT DOCUMENTS

| | | |
|---|---|---|
| DE | 4414132 A1 | 10/1994 |
| DE | 102007057310 A1 | 6/2009 |
| EP | 2846019 A1 | 3/2015 |
| FR | 2506837 A1 | 12/1982 |
| GB | 1085321 A | 9/1967 |
| WO | 9514853 A1 | 6/1995 |
| WO | 0151786 A1 | 7/2001 |

OTHER PUBLICATIONS

Written Opinion of the International Searching Authority for PCT/SE2016/050944 dated Dec. 12, 2016.
Scania CV AB, International Application No. PCT/SE2016/050944, International Preliminary Report on Patentability, dated May 8, 2018.
Scania CV AB, European Application No. 16862555.6, Extended European Search Report, dated May 23, 2019.

* cited by examiner

FOUR STROKE INTERNAL COMBUSTION ENGINE

CROSS-REFERENCE TO RELATED APPLICATION(S)

This application is a National Stage Application (filed under 35 § U.S.C. 371) of PCT/SE2016/050944, filed Oct. 5, 2016 of the same title, which, in turn claims priority to Swedish Application No. 1551415-1 filed Nov. 3, 2015 of the same title; the contents of each of which are hereby incorporated by reference.

FIELD OF THE INVENTION

The present invention relates to a four stroke internal combustion engine comprising a turbine.

BACKGROUND OF THE INVENTION

In a four stroke combustion engine comprising a turbine such as e.g. a turbocharger, exhaust gas pressure in a cylinder is utilized to drive a turbine wheel of the turbine.

A piston of a four stroke internal combustion engine performs four strokes, an intake stroke, a compression stroke, a power stroke, and an exhaust stroke. An exhaust port arrangement of the internal combustion engine, comprising e.g. ordinary exhaust poppet valves, has to be opened before the piston reaches its bottom dead centre, BDC, during the power stroke. Otherwise, if the exhaust arrangement would open later, e.g. when the piston reaches the BDC, the internal pressure from the exhaust gases inside the cylinder would impede the movement of the piston towards the top dead centre, TDC, during the exhaust stroke. Available engine power would thus be reduced.

The opening of the exhaust arrangement before the bottom dead centre, BDC, of the piston during the power stroke permitting a portion of the exhaust gases to escape through the exhaust arrangement before the piston reaches BDC, is referred to as blowdown. The term blowdown may also be used in connection with the exhaust gases escaping through the exhaust arrangement prior to the piston reaching BDC and after the piston has reached BDC, while the pressure inside the cylinder exceeds the pressure in the exhaust system downstream of the exhaust arrangement. The energy (work) of the blowdown, blowdown energy, escapes through the exhaust arrangement and is not transferred to a crankshaft of the relevant internal combustion engine.

U.S. Pat. No. 5,067,452 discloses a cylinder head in a compression-ignition engine with at least three cylinders each having a single opening for admission of fuel charge, a single opening for exhaust gases, a first set of channels which connect the fuel charge admitting opening with the inlet valves for discrete cylinders, and a second set of channels which connect the opening for exhaust gases with the exhaust valves for discrete cylinders. The inlet of a turbocharger is directly connected to the opening for exhaust gases and the outlet pipe of the turbocharger for fuel charge is directly connected to the fuel charge admitting opening. Thus, shortest possible gas ducts on inlet and outlet sides of the cylinders may be provided to avoid pressure and temperature losses in order to utilize as much exhaust gas energy in the turbocharger as possible.

DE 4414132 discloses direct ducts from the outlet valves of each cylinder of a combustion engine to a turbine. The attained energy yield is used to increase the air volume in the combustion chamber by increased charge, for reducing the NOx emission. The piston power, induced during the expansion stroke, is adjusted below that permitted by the supplied air volume to obtain the required, reduced NOx values. The exhaust manifold cross-section may be smaller than the valve through flow surface, with the cross-sectional widening only at the turbine gas inlet.

U.S. Pat. No. 4,535,592 discloses a turbo compound engine of internal combustion type having conventional reciprocally movable pistons, cylinders, manifolds, fuel-oxygen admixing apparatus or fuel injection, firing apparatus or compression ignition, and incorporating the improvement of respective nozzle means for conveying the hot, moderately high pressure combustion products (exhaust gases) from the respective cylinders to one or more turbines. The nozzle means have its inlet and discharge ends connected, respectively, with the respective boundary walls of respective combustion chambers or cylinders and with the inlet to a turbine. A quick opening nozzle valve admits exhaust gas from the respective cylinder to the nozzle means.

SUMMARY OF THE INVENTION

It is an object of the present invention to provide a four stroke combustion engine comprising a turbine, in which turbine blowdown energy of the internal combustion engine is utilized to a larger extent than in the combustion engines of the above discussed prior art documents.

According to an aspect of the invention, the object is achieved by a four stroke internal combustion engine comprising at least one cylinder arrangement, an exhaust conduit, and a turbine comprising a turbine wheel, the turbine having a turbine wheel inlet area, $A_{TIN}$. The at least one cylinder arrangement forms a combustion chamber and comprises a piston arranged to reciprocate in a cylinder bore and an exhaust port arrangement, the exhaust port arrangement being configured to open and close an exhaust flow area, $A_{CYL}$, during an exhaust sequence of the piston reciprocation. The cylinder arrangement has a maximum volume, $V_{MAX}$, between a bottom dead centre, BDC, of the piston and an upper inner delimiting surface of the combustion chamber. The exhaust conduit extends between the exhaust flow area, $A_{CYL}$, and the turbine wheel inlet area, $A_{TIN}$, and has an exhaust conduit volume, $V_{EXH}$. The exhaust conduit volume, $V_{EXH}$, is ≤0.5 times the maximum volume, $V_{MAX}$ and the exhaust port arrangement is configured to expose the exhaust flow area, $A_{CYL}$, at a size of at least 0.22 times the maximum volume, $V_{MAX}$, when the piston is at the bottom dead centre, BDC.

Since the exhaust conduit volume, $V_{EXH}$, is ≤0.5 times the maximum volume, $V_{MAX}$ i.e. $V_{EXH} \leq 0.5 * V_{MAX}$, and since the exhaust port arrangement is configured to expose the exhaust flow area, $A_{CYL}$, at a size of at least 0.22 times the maximum volume, $V_{MAX}$, i.e. $A_{CYL} \geq 0.22 * V_{MAX}$, when the piston is at the bottom dead centre, BDC, the blowdown energy of the exhaust gases is efficiently utilized in the turbine. As a result, the above mentioned object is achieved.

It has been discovered by the inventors that the defined maximum exhaust conduit volume, $V_{EXH}$, in combination with an exhaust flow area which has been opened to correspond to at least the size of 0.22 times the maximum volume, $V_{MAX}$, when the piston is at the BDC, results in a large portion of the blowdown energy being transferred to the turbine. That is, an initial burst of exhaust gases produced by the blowdown, in an unrestricted manner, passes through the exhaust flow area, $A_{CYL}$, and is transferred via the exhaust conduit to the turbine wheel inlet area, $A_{TIN}$, to be utilized in the turbine.

The four stroke internal combustion engine may comprise more than one cylinder arrangement each having a piston and an exhaust port arrangement. The four stroke internal combustion engine may comprise more than one turbine. The turbine may for instance be a turbocharger, it may form part of a turbo compound engine, or may be a turbine driving an electric generator. The piston, or pistons, of the internal combustion engine may be connected via connecting rod/s to a crankshaft of the internal combustion engine.

Inside the cylinder arrangement, above the piston, there is a combustion chamber. Intake air enters the combustion chamber through an intake arrangement of the cylinder arrangement during the intake stroke of the piston. The intake air may be compressed to by the turbocharger. The internal combustion engine may be e.g. a compression ignition (CI) engine, such as a Diesel type engine, or a spark ignition engine, such as an Otto type engine and comprises in the latter case a sparkplug or similar device in the cylinder arrangement. Fuel may be injected into the combustion chamber during part of the compression stroke of the piston, or may be entrained with the intake air. The fuel may ignite near the TDC between the compression stroke and the power stroke of the piston.

According to embodiments, a momentary cylinder volume, V, of the cylinder arrangement is defined by a momentary position of the piston in the cylinder bore during its reciprocation, and $A_{CYL}(V)$ expresses the exhaust flow area, $A_{CYL}$, as a function of the momentary cylinder volume, V, during a power stroke of the piston. An exhaust flow area coefficient, $\delta$, is defined as, $\delta = A_{CYL}(V)/(0.22 * V_{MAX})$, $A_{CYL}$ being expressed in m² and $V_{MAX}$ being expressed in m³. The exhaust port arrangement has an opening speed coefficient, $\beta$, defined as $\beta = (V(\delta=1) - V(\delta=0.1))/V_{MAX}$, and the exhaust flow area, $A_{CYL}$, may have an opening speed coefficient $\beta < 0.06$.

In this manner, the exhaust flow area, $A_{CYL}$, may be opened at a speed providing low flow resistance in the exhaust port arrangement. Thus, a quick transfer of the blowdown energy from the combustion chamber into the exhaust conduit may be promoted. Moreover, the defined maximum exhaust conduit volume, $V_{EXH}$, in combination with the defined opening speed coefficient, $\beta$, may ensure that an initial burst of exhaust gases produced by the blowdown energy is available to be utilized in the turbine.

Put differently, the opening speed coefficient $\beta < 0.06$ means that the cylinder volume increases less than 6% while $A_{CYL}$ increase from 10% to 100% of $V_{MAX}$ during a power stroke.

According to embodiments, the turbine has a normalized effective flow area, $\gamma$, defined as $\gamma = A_{TURB}/V_{MAX}$, wherein $\gamma$ may be $>0.22$ m⁻¹, wherein $A_{TURB} = (A_{TIN}/A_{TOT}) * M'_{RED} * (R/(\kappa(2/(\kappa+1))))^{1/2}$, wherein $X = (\kappa+1)/(\kappa-1)$, wherein $A_{TOT}$ is a total inlet area of the turbine, and wherein $A_{TURB}$ is obtained at a reduced mass flow, $m'_{RED}$, of the turbine at 2.5-3.5 pressure ratio between an inlet side and an outlet side of the turbine and at a tip speed of 450 m/s of the turbine wheel.

In this manner, a turbine is provided in which an initial burst of exhaust gases, produced by the blowdown from one cylinder arrangement and transferred via the defined exhaust flow area, $A_{CYL}$, at the BDC and the defined exhaust conduit volume, $V_{EXH}$, to the turbine wheel inlet area, $A_{TIN}$, may be utilized. Moreover, in a turbine having such defined normalized effective flow area, $\gamma$, the blowdown energy may be extracted from the exhaust gases over a crank angle of the crankshaft of <80 degrees. Thus, blowdown energy may be extracted individually from each of the cylinder arrangements connected to the turbine, as exhaust gases from the different cylinder arrangements reach the turbine at different crank angles of the crankshaft.

Besides the improved blowdown energy utilisation in the turbine, the four stroke internal combustion engine of the above discussed kind also has excellent gas exchange properties. That is, due to the quick opening of the exhaust port arrangement and the large available exhaust flow area already at the BDC, as well as the above defined properties of the turbine, the exhaust gases are subjected to a low back pressure. A low back pressure in an exhaust system of the internal combustion engine promotes efficient, low energy, ejection of the exhaust gases. In a four stroke internal combustion engine as defined above, such low energy ejection is achieved while still a large amount of the blowdown energy is utilized in the turbine having the above defined properties. Put differently, a large amount of the available blowdown energy is recovered in the turbine without penalizing the exhaust stroke with a high in-cylinder pressure, which would result in high negative piston pumping work.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION OF THE INVENTION

Aspects of the present invention will now be described more fully. Like numbers refer to like elements throughout. Well-known functions or constructions will not necessarily be described in detail for brevity and/or clarity.

Figure 1:
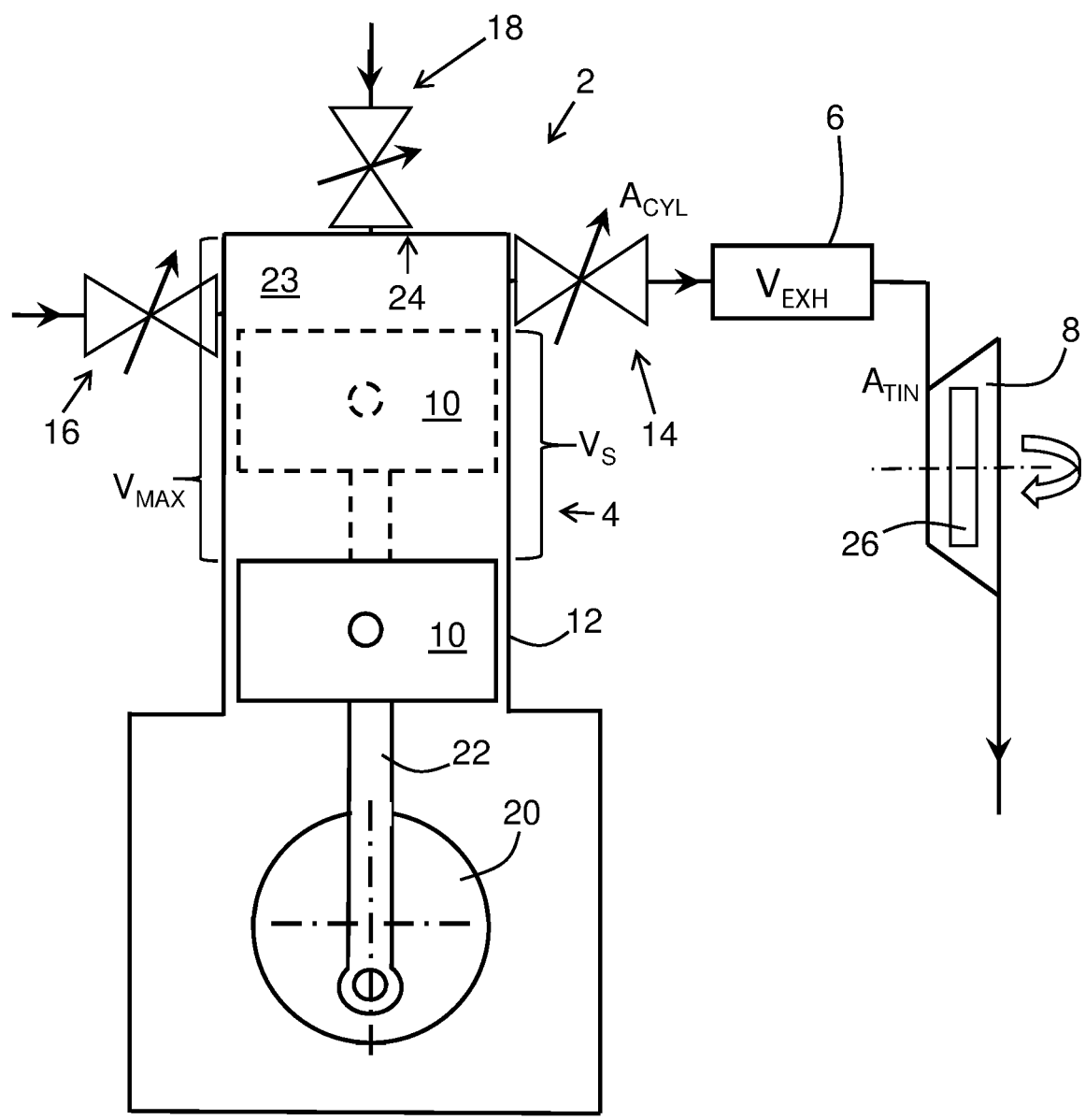
FIG. 1 schematically illustrates a cross section through a four stroke internal combustion engine according to embodiments.

FIG. 1 illustrates schematically a four stroke internal combustion engine 2 according to embodiments. The four stroke internal combustion engine 2 comprises at least one cylinder arrangement 4, an exhaust conduit 6, and at least one turbine, exemplified in the form of a turbocharger 8.

The at least one cylinder arrangement 4 comprises a piston 10, a cylinder bore 12, an exhaust port arrangement 14, an inlet port arrangement 16, and a fuel injection arrangement 18, and/or an ignition device. The piston 10 is arranged to reciprocate in the cylinder bore 12. In FIG. 1 the piston 10 is illustrated with continuous lines at its bottom dead centre, BDC, and with dashed lines at its top dead centre, TDC. The cylinder arrangement 4 has a maximum volume, $V_{MAX}$, between the BDC of the piston 10 and an upper inner delimiting surface 24 of a combustion chamber 23. The combustion chamber 23 is formed above the piston 10 inside the cylinder arrangement 4. The piston 10 is connected to a crankshaft 20 of the internal combustion engine 2. In these embodiments the piston 10 is directly connected to the crankshaft 20 by means of a piston rod 22.

The cylinder arrangement 4 has a total swept volume, $V_S$, in the cylinder bore 12 between the BDC and the TDC. The cylinder arrangement 4 has a compression ratio, ε. $V_{MAX}$ may be expressed as: $V_{MAX}=V_S*(\varepsilon/(\varepsilon-\varepsilon-1))$.

The exhaust port arrangement 14 is configured to open and close an exhaust flow area, $A_{CYL}$, during an exhaust sequence of the piston reciprocation. The exhaust sequence starts before the piston 10 reaches its BDC during the power stroke and ends around the TDC of the piston between the exhaust stroke and the intake stroke. During the reciprocation of the piston 10, the cylinder arrangement 4 has a momentary cylinder volume, V. That is, the momentary cylinder volume, V, of the cylinder arrangement is defined by a momentary position of the piston 10 in the cylinder bore 12. Accordingly, the exhaust flow area, $A_{CYL}$, may be expressed as a function of the momentary cylinder volume, V, i.e. $A_{CYL}(V)$. As will be discussed below, $A_{CYL}(V)$ during a power stroke of the piston 10 is utilized to define an opening speed of that the exhaust port arrangement 14.

The turbocharger 8 comprises a turbine wheel 26. The turbocharger 8 comprises a turbine wheel inlet area, $A_{TIN}$. The turbine wheel inlet area, $A_{TIN}$, is provided at an opening of a housing of the turbocharger 8 where the exhaust gases are admitted to the turbine wheel 26. The turbine wheel inlet area, $A_{TIN}$, may suitably be the nozzle throat area of the turbocharger 8. The nozzle throat area may also be referred to as turbine house throat area, turbine house critical area, or similar and may often be specified for a specific turbine. In cases the nozzle throat is not specified for a specific turbine, and/or the position of the nozzle throat area is not specified, the turbine wheel inlet area, $A_{TIN}$, extends perpendicularly to a flow direction of the exhaust gases. In embodiments of turbines where the exhaust conduit extends along a portion of the turbine wheel e.g. in a volute, such as e.g. in a twin scroll turbocharger, the turbine wheel inlet area, $A_{TIN}$, is defined at the section of the exhaust conduit where the turbine wheel is first exposed to the exhaust gases emanating from the relevant cylinder arrangement.

The exhaust conduit 6 connects the exhaust port arrangement 14 with the turbocharger 8. The exhaust conduit 6 has an exhaust conduit volume, $V_{EXH}$. In FIG. 1 the exhaust conduit volume, $V_{EXH}$, is illustrated as a box. In practice, the exhaust conduit 6 extends between the exhaust flow area, $A_{CYL}$, and the turbine wheel inlet area, $A_{TIN}$. Accordingly, the exhaust conduit volume, $V_{EXH}$ is formed by the volume of the exhaust conduit between the exhaust flow area, $A_{CYL}$, and the turbine wheel inlet area, $A_{TIN}$. In these embodiments the exhaust conduit 6 fluidly connects only the exhaust flow area, $A_{CYL}$, with the turbine wheel inlet area, $A_{TIN}$. That is, the exhaust conduit 6 forms a separate conduit extending between the exhaust flow area, $A_{CYL}$, and the turbine wheel inlet area, $A_{TIN}$. The separate conduit does not have any other inlets or outlets for exhaust gases. Thus, the turbine wheel inlet area, $A_{TIN}$, is a dedicated inlet area of the turbocharger 8 for the particular exhaust flow area, $A_{CYL}$, connected thereto via the exhaust conduit 6. The exhaust conduit volume, $V_{EXH}$, is ≤0.5 times the maximum volume, $V_{MAX}$, i.e. $V_{EXH} \leq 0.5*V_{MAX}$. Further, the exhaust port arrangement 14 is configured to expose the exhaust flow area, $A_{CYL}$, at a size of at least 0.22 times the maximum volume, $V_{MAX}$, i.e. $A_{CYL} \geq 0.22*V_{MAX}$, when the piston 10 is at the BDC. Accordingly, the criteria: $A_{CYL}/V_{MAX} \geq 0.22$ m$^{-1}$ is fulfilled when the piston 10 is at the BDC.

The turbine wheel 26 of the turbocharger 8 may be connected to an impeller (not shown) for compressing and transporting intake air to the intake port arrangement 16. According to some embodiments, the turbine wheel 26 may be an axial turbine wheel. A turbocharger comprising an axial turbine wheel may provide the low back pressure discussed herein. However, according to alternative embodiments the turbine wheel may be a radial turbine wheel, which also may provide the low back pressure discussed herein.

According to some embodiments, the cylinder arrangement 4 may have a total swept volume, $V_S$, in the cylinder bore 12 between the bottom dead centre, BDC, and the top dead centre, TDC, of the piston 10, wherein $0.3<V_S<4$ litres. Mentioned purely as an example, in the lower range of $V_S$, the cylinder arrangement 4 may form part of an internal combustion engine for a passenger car, and in the middle and higher range of $V_S$, the cylinder arrangement 4 may form part of an internal combustion engine for a heavy load vehicle such as e.g. a truck, a bus, or a construction vehicle. Also in the higher range of $V_S$, the cylinder arrangement 4 may form part of an internal combustion engine for e.g. a generator set (genset), for marine use, or for rail bound (train) use.

Figure 6:
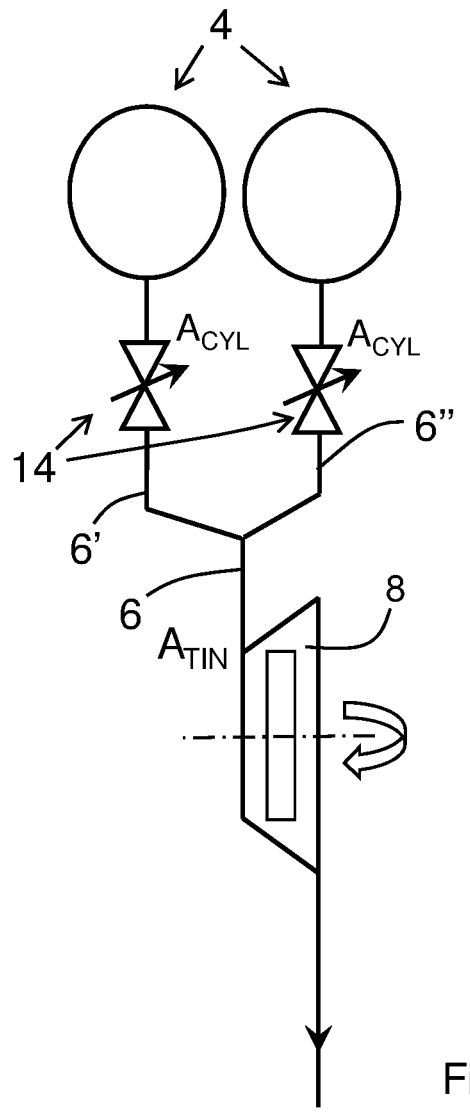
FIG. 6 illustrates embodiments wherein two cylinder arrangements are connected to a turbocharger via one turbine wheel inlet area, such that the two cylinder arrangements share the same turbine wheel inlet area.
Figure 7:
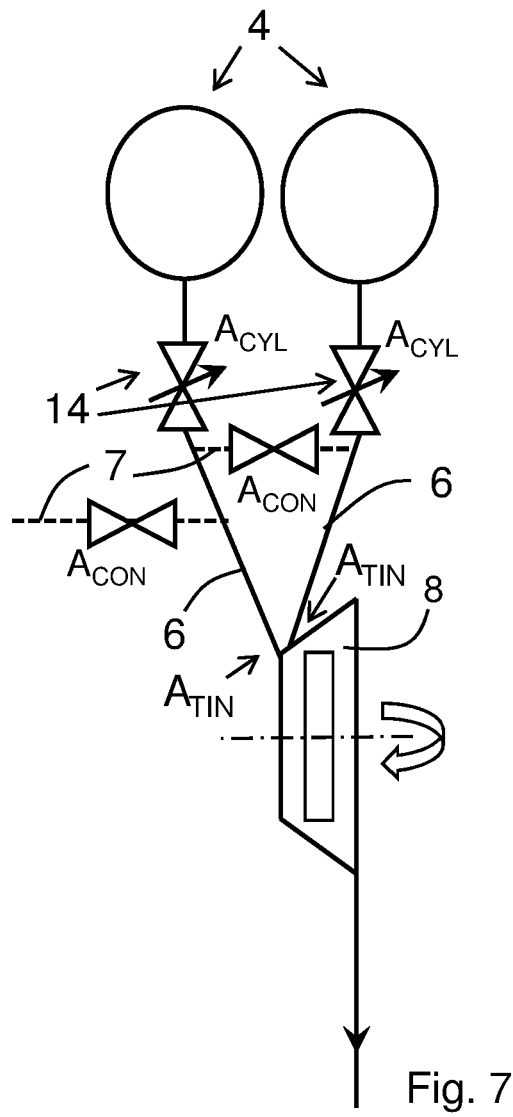
FIG. 7 illustrates embodiments wherein two cylinder arrangements are connected to a turbocharger via two separate exhaust conduits, each leading to one turbine wheel inlet area.

According to alternative embodiments, more than one cylinder arrangement may connect to the turbocharger at one position of the turbocharger. FIG. 6 illustrates embodiments wherein two cylinder arrangements 4 are connected to a turbocharger 8 via one turbine wheel inlet area, $A_{TIN}$, i.e. the two cylinder arrangements 4 share the same turbine wheel inlet area, $A_{TIN}$. Accordingly, the exhaust conduit branches 6', 6" from the exhaust port arrangements 14 of the two cylinder arrangements 4 are connected to form a common exhaust conduit 6 leading to the turbocharger 8 and the turbine wheel inlet area, $A_{TIN}$. Since there exists a certain degree of crossflow between the two exhaust conduit branches 6', 6" as exhaust gases flow from one of the cylinder arrangements 4 to the turbine wheel inlet area, $A_{TIN}$, the above discussed criteria: $V_{EXH} \leq 0.5*V_{MAX}$ is valid for the collective exhaust conduit volume, $V_{EXH}$, of both exhaust conduit branches 6', 6" and the common exhaust conduit 6. FIG. 7 illustrates embodiments wherein two cylinder arrangements 4 are connected to a turbocharger 8 via two separate exhaust conduits 6, each leading to one turbine wheel inlet area, $A_{TIN}$. The turbine wheel inlet areas, $A_{TIN}$, are positioned adjacent to each other such that they may be considered to be connect to the turbocharger 8 at one position of the turbocharger 8. The crossflow between two turbine wheel inlet areas, $A_{TIN}$, is negligible. Accordingly, for each of the exhaust conduits 6 the above discussed criteria: $V_{EXH} \leq 0.5*V_{MAX}$ is valid.

In general, volumes of connections to/from the exhaust conduits 6 are not considered to form part of the exhaust conduit volume, $V_{EXH}$, if such connections have a cross sectional area below a limit value. According to embodiments the exhaust conduit volume, $V_{EXH}$, excludes all volumes connected to the exhaust conduit 6 via a connection having a minimum connection cross section area, $A_{CON}$, ≤0.022 times the maximum volume, $V_{MAX}$. That is, the limit value of the cross sectional area, $A_{CON}$, is 10% of the above discussed criteria related to the exhaust flow area, $A_{CYL}$, when the piston 10 is at the bottom dead centre, BDC. With such a small cross sectional area, $A_{CON}$, any crossflow of exhaust gases through a connection is negligible. In FIG. 7 two example connections 7 with minimum connection cross section areas, $A_{CON}$, have been indicated. Mentioned purely as an example, such connections 7 may form part of an exhaust gas recirculation (EGR) system, or may connect to sensors, etc.

Figure 2:
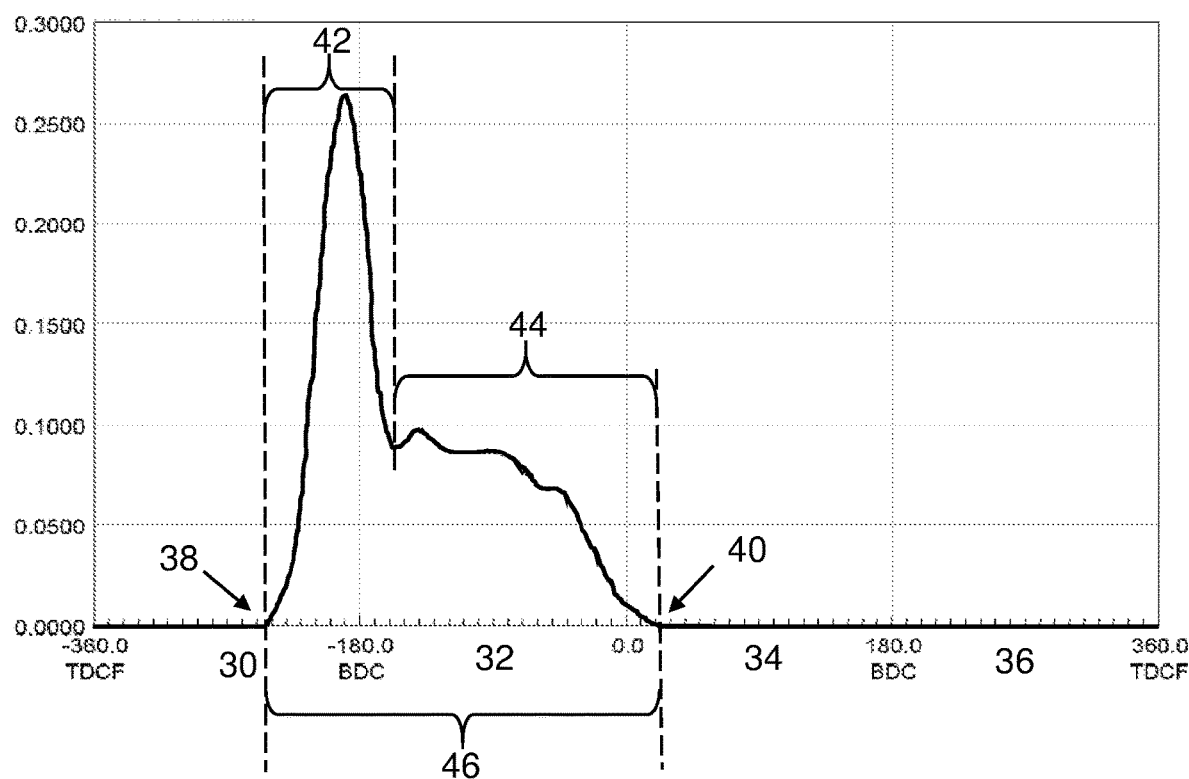
FIG. 2 illustrates a diagram of mass flow rate across an exhaust port arrangement of a four stroke internal combustion engine.

FIG. 2 illustrates a diagram of mass flow rate across an exhaust port arrangement of a four stroke internal combustion engine. Along the X-axis of the diagram the four strokes, power stroke 30, exhaust stroke 32, intake stroke 34, and compression stroke 36 of a piston in a cylinder bore of a cylinder arrangement of the internal combustion engine are indicated between the bottom dead centres, BDC, and top dead centres, TDC, of the piston. The angle of the crankshaft of the internal combustion engine is also given on the X-axis. 0 degrees crankshaft angle is set at the TDC between the exhaust stroke 32 and the intake stroke 34. An example mass flow rate in kg/s through the exhaust port arrangement is given on the Y-axis.

The graph of the diagram shows the mass flow rate across the exhaust port arrangement. At point 38 the exhaust port arrangement starts to open. At point 40 the exhaust port arrangement has closed again. Thus, during a period in between points 38 and 40, the exhaust flow area, $A_{CYL}$, is exposed and increases to a maximum, then decreases and closes. During the period in between points 38 and 40 the exhaust gases are ejected from the cylinder arrangement via the exhaust port arrangement. The period in between points 38 and 40 may be roughly divided into two parts, blowdown 42 and scavenging 44. During blowdown 42 an excessive pressure prevails in the exhaust gases in the cylinder bore, compared to a pressure downstream of the exhaust flow area, $A_{CYL}$. The excessive pressure causes spontaneous outflow of the exhaust gases from the cylinder bore via the exhaust flow area, $A_{CYL}$. The excessive pressure may be utilized e.g. in a turbine. During scavenging 44 there no longer prevails an excessive pressure in the exhaust gases in the cylinder bore compared to a pressure downstream of the exhaust flow area, $A_{CYL}$, and the exhaust gases are ejected across the exhaust port arrangement by the piston as it travels upwardly in the cylinder bore.

With reference to embodiments discussed herein, the exhaust sequence starts at point 38, ends at point 40, and is indicated with reference number 46. Moreover, at the BDC in between the power stroke 30 and the exhaust stroke 32 (−180.0 degrees), the exhaust flow area, $A_{CYL}$, has been opened to such an extent that $A_{CYL} \geq 0.22 \cdot V_{MAX}$.

Figure 3:
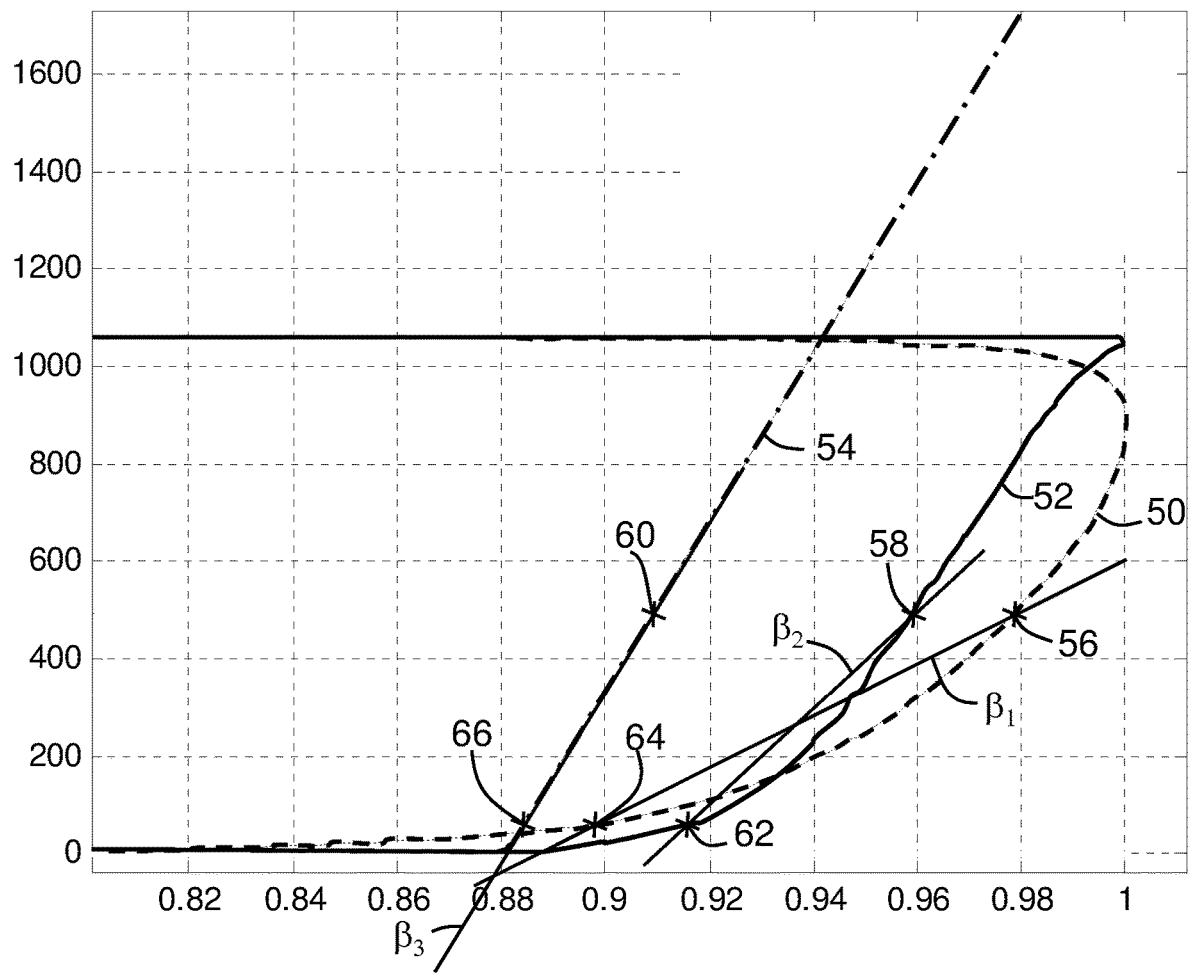
FIG. 3 illustrates a diagram of exhaust flow areas of exhaust port arrangements.

FIG. 3 illustrates a diagram of exhaust flow areas, $A_{CYL}$, of exhaust port arrangements. Each such exhaust port arrangement forms part of a cylinder arrangement further comprising a piston arranged to reciprocate in a cylinder bore. Along the Y axis example exhaust flow area of the exhaust port arrangement is given in mm². Along the X axis relative cylinder volume is given, i.e. the ratio between the momentary cylinder volume, V, and the maximum volume, $V_{MAX}$, which ratio is calculated, $V/V_{MAX}$. Accordingly, at the ratio 1 the piston is at its BDC.

Three graphs 50, 52, 54 are shown in the diagram. A first graph 50 relates to an exhaust port arrangement comprising standard camshaft controlled exhaust poppet valves. The first graph 50 shows that the poppet valves are opened at a ratio of approximately 0.82, and that the exhaust flow area of the poppet valves increases gradually as the piston travels towards the BDC and reaches its maximum exhaust flow area at a ratio of approximately 0.88 as the piston is travelling towards the TDC. A second graph 52 relates to an exhaust port arrangement comprising electronically and/or hydraulically operated exhaust poppet valves. The second graph 52 shows that the poppet valves are opened at a ratio of approximately 0.88 and that the exhaust flow area of the poppet valves increases gradually as the piston travels towards the BDC and reaches its maximum exhaust flow area at a ratio of approximately 1 as the piston reaches the BDC. A third graph 54 relates to a fast opening large area exhaust port arrangement, e.g. of the type shown in U.S. Pat. No. 4,535,592. The third graph 54 shows that the exhaust port arrangement is opened at a ratio of approximately 0.88 and that the exhaust flow area of the exhaust port arrangement increases gradually as the piston travels towards the BDC.

As will be discussed below, the first graph 50 illustrates the characteristics of a prior art exhaust port arrangement, whereas the second and third graphs 52, 54 illustrate characteristics of exhaust port arrangements of embodiments discussed herein.

According to embodiments, a momentary cylinder volume, V, of the cylinder arrangement is defined by a momentary position of the piston in the cylinder bore during its reciprocation. $A_{CYL}(V)$ expresses the exhaust flow area, $A_{CYL}$, as a function of the momentary cylinder volume, V, during a power stroke of the piston. An exhaust flow area coefficient, δ, is defined as, $$\delta = A_{CYL}(V)/(0.22 \cdot V_{MAX}),$$

wherein $A_{CYL}$ is expressed in m² and $V_{MAX}$ is expressed in m³. In the diagram of FIG. 3, the power stroke of the piston is in a rightward direction, as the ratio increases. The power stroke ends at the ratio 1. An exhaust stroke of the piston is in a leftward direction in the diagram, as the ratio decreases. Further, the exhaust port arrangement has an opening speed coefficient, β, defined as, $$\beta(V(\delta=1)-V(\delta=0.1))/V_{MAX}.$$

That is, V(δ=1) represents the momentary cylinder volume V when δ equals 1, and V(δ=0.1) represents the momentary cylinder volume, V, when δ equals 0.1. Since δ is based on the exhaust flow area, $A_{CYL}$, the opening speed coefficient, β, represents a value for how fast opening a particular exhaust port arrangement of a cylinder arrangement is. The lower the opening speed coefficient, β, the faster a particular exhaust port arrangement is.

According to embodiments discussed herein, the exhaust port arrangement may have an opening speed coefficient β<0.06 in order to efficiently utilize the blowdown energy in the turbocharger.

In the diagram of FIG. 3 the opening speed coefficient, β, of an exhaust port arrangement for cylinder arrangements having a particular $V_{MAX}$ is represented by a respective line extending through the points 56, 58, 60 representing V(δ=1) and the points 62, 64, 66 representing V(δ=0.1) on the relevant graphs 50, 52, 54. Thus, the opening speed coefficient, $\beta_1$, for the exhaust port arrangement comprising standard camshaft controlled exhaust poppet valves represented by the first graph 50, $\beta_1$=0.09. For the exhaust port arrangements represented by the second and third graphs 52, 54, $\beta_2$=0.04 and $\beta_1$=0.025, respectively. Thus, the exhaust port arrangements represented by the second and third graphs 52, 54 fulfil the requirement β<0.06.

The exhaust sequence mentioned in connection with the embodiments herein, starts on the respective graph 52, 54 where the exhaust port arrangement opens and then follows along the graph to the right in the diagram to the BDC, and then follows along the graph to the left in the diagram towards the TDC. Thus, for the exhaust port arrangement represented by the second graph 52 only the beginning of the exhaust sequence is represented in the diagram. Ratios below 0.80, as the piston travels towards TDC, are not shown in the diagram. For the exhaust port arrangement represented by the third graph 54 an even shorter portion of the exhaust sequence is represented in the diagram. Due to the comparatively large exhaust flow area, $A_{CYL}$, and the quick opening speed, of the relevant exhaust port arrangement, the third graph 54 at the ratio 1 extends outside the diagram.

Figure 4:
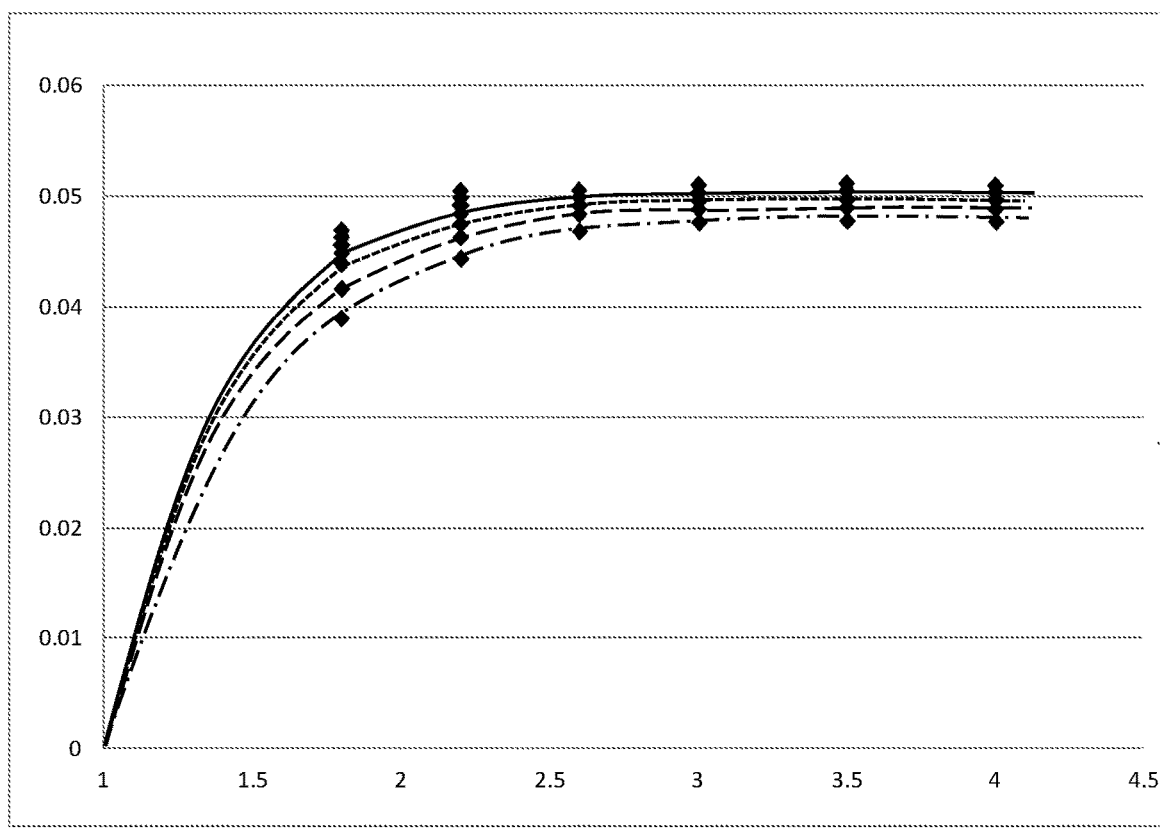
FIG. 4 illustrates a schematic example of a turbine map of a turbocharger, FIG. 5 schematically illustrates two embodiments of a four stroke internal combustion engine.

For a particular turbine, turbine rig test results are plotted in a turbine map. Based on such turbine maps a suitable turbine may be selected for a particular four stroke internal combustion engine. In one type of turbine map a number of turbine speed lines may be plotted against a corrected flow and pressure ratios over the turbine. Such turbine speed lines may represent e.g. so-called reduced turbine rotational speeds, $RPM_{RED}$. The corrected flow may be represented e.g. by a reduced mass flow, $m'_{RED}$. The standards SAE J1826 and SAE J922 relate to test procedures, nomenclature and terminology of turbochargers, and are incorporated herein by reference for further details of turbine maps and parameters related to turbochargers.

$$m'_{RED} = m'^{*}(T)^{1/2}/P,$$

wherein m' is an actual mass flow rate through the turbine wheel, T is the exhaust gas temperature before the turbine wheel, and P is the exhaust gas pressure before the turbine wheel. In FIG. 4 a schematic example of a turbine map of a turbocharger is illustrated.

According to embodiments, the turbine has a normalized effective flow area, γ, defined as $\gamma = A_{TURB}/V_{MAX}$. Thus, the turbine wheel inlet area, $A_{TIN}$, may be defined in relation to the maximum volume, $V_{MAX}$, of the cylinder arrangement. Namely, $$A_{TURB} = (A_{TIN}/A_{TOT})^{*}M'_{RED}*(R/(\kappa K(2/(\kappa+1)^{X})))^{1/2},$$

wherein $X=(\kappa+1)/(\kappa-1)$. As mentioned above, $A_{TIN}$, is the turbine wheel inlet area connected to the exhaust flow area, $A_{CYL}$, of a cylinder arrangement. The turbine may have more than one inlet area. Accordingly, $A_{TOT}$ is a total inlet area of the turbine, i.e. $A_{TIN}$ and any additional turbine wheel inlet areas, $A_{TINX}$, etc. ($A_{TOT}=A_{TIN}+A_{TINX}+\ldots$). R is the specific gas constant. An example value of R may be 287. $\kappa=C_p/C_v$, where $C_p$ is the specific heat capacity at constant pressure of the exhaust gases and $C_v$, is the specific heat capacity of the exhaust gases at constant volume. An example value of κ may be 1.4 at a temperature of 293 K.

$A_{TURB}$ is obtained at a reduced mass flow, $m'_{RED}$, of the turbine at 2.5-3.5 pressure ratio between an inlet side and an outlet side of the turbine and at a tip speed of 450 m/s of the turbine wheel. $A_{TURB}$ for a particular turbine may be obtained e.g. by extracting the reduced mass flow, $m'_{RED}$, from a relevant turbine map for a turbine speed corresponding to the relevant tip speed at the relevant pressure ratio, and calculating $A_{TURB}$ with relevant data for the turbine and its operating conditions. Thereafter, γ may be calculated. According to embodiments herein γ>0.22 m$^{-1}$.

As discussed above, the exhaust port arrangement is configured to expose the exhaust flow area, $A_{CYL}$, at a size of at least $0.22*V_{MAX}$, when the piston is at the bottom dead centre, BDC. In a turbine having a normalized effective flow area γ>0.22 m$^{-1}$, the turbine wheel inlet area, $A_{TIN}$, may correspond to the above defined exhaust flow area, $A_{CYL}$, ($A_{CYL} \geq 0.22*V_{MAX}$), when the piston is at the bottom dead centre, BDC. Put differently, the exhaust flow area coefficient δ≥1 at the bottom dead centre, BDC, of the piston. In combination with the defined $V_{EXH} \leq 0.5*V_{MAX}$ thus, an efficient transfer of the blowdown energy from the exhaust port arrangement to the turbine wheel inlet area, $A_{TIN}$, may be achieved. Accordingly, a low pressure drop may be provided as the exhaust gases are transferred from the cylinder arrangement to the turbine and the blowdown energy may be transformed into useful work as the exhaust gases expand over the turbine wheel of the turbine. Also, the above discussed fast opening of the exhaust valve arrangement with the opening speed coefficient β<0.06 may contribute to the low pressure drop from the cylinder arrangement to the turbine.

Figure 5:
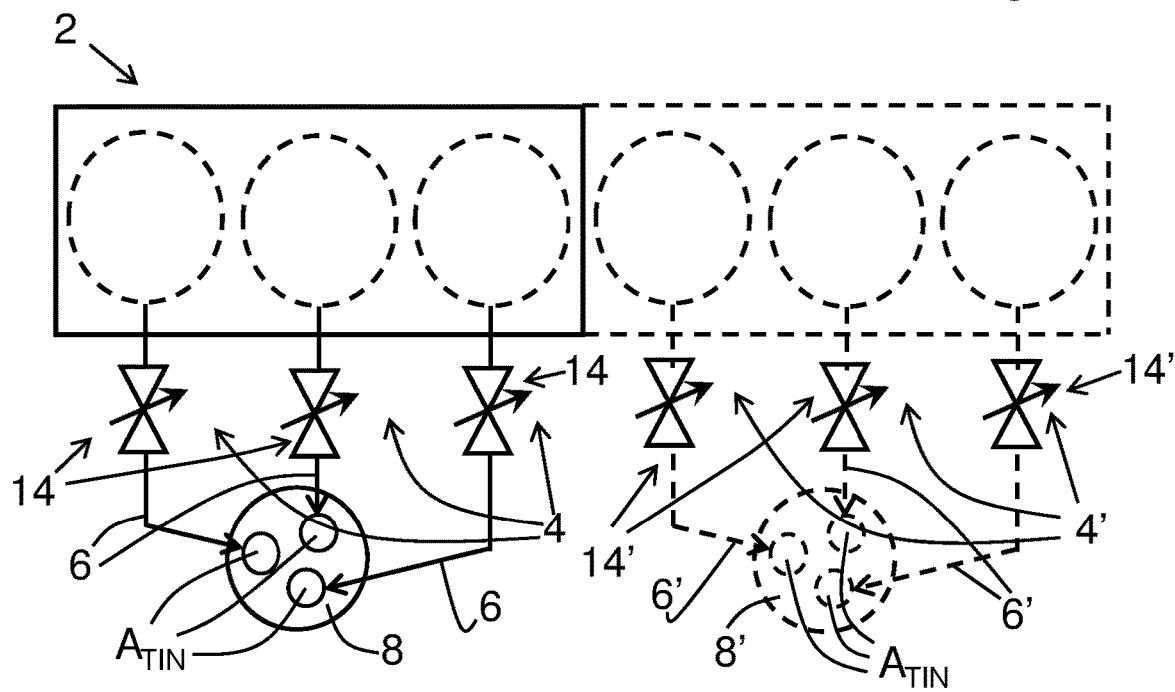

FIG. 5 illustrates first example embodiments of a four stroke internal combustion engine 2, and second example embodiments of a four stroke internal combustion engine 2.

With continuous lines, the first example embodiments of a four stroke internal combustion engine 2 comprising three cylinder arrangements 4 is illustrated in FIG. 5. Each cylinder arrangement 4 comprises an exhaust port arrangement 14, wherein a separate exhaust conduit 6 fluidly connects only one of each exhaust port arrangement 14 with a separate inlet area, $A_{TIN}$, of a turbocharger 8. Each cylinder arrangement 4 is a cylinder arrangement 4 as discussed in connection with FIG. 1.

The above discussed and defined opening speed coefficient, β, and normalized effective flow area, γ, apply to at least one of the cylinder arrangements 4. According to embodiments, each cylinder arrangement 4 has an opening speed coefficient β<0.06, as defined herein. According to some embodiments the above discussed and defined opening speed coefficient, β, and normalized effective flow area, γ, apply to each of the cylinder arrangements 4 and the thereto connected turbocharger 8.

According to embodiments, each of the three cylinder arrangements 4 may be arranged to fire at an approximately 240 degrees crankshaft angle separation interval.

According to the second example embodiments illustrated in FIG. 5, the four stroke internal combustion engine 2 comprises six cylinder arrangements 4, 4'. These embodiments comprise the three cylinder arrangements 4 of the previous embodiments as well as the three cylinder arrangements 4' indicated with dashed lines. Again, each cylinder arrangement 4, 4' comprises an exhaust port arrangement 14, 14' wherein a separate exhaust conduit 6, 6' fluidly connects only one of each exhaust port arrangement 14, 14' with a separate inlet area, $A_{TIN}$, of a turbocharger 8, 8'. In these embodiments the internal combustion engine comprises two turbochargers 8, 8'. Three separate exhaust conduits 6 are connected to a first turbocharger 8, and three separate exhaust conduits 6' are connected to a second turbocharger and 8'. Again, each cylinder arrangement 4, 4' is a cylinder arrangement 4, 4' as discussed in connection with FIG. 1. The above discussed and defined opening speed coefficient, β, and normalized effective flow area, γ, apply to at least one of the cylinder arrangements 4, 4'. According to some embodiments the above discussed and defined opening speed coefficient, β, and normalized effective flow area, γ, apply to each of the cylinder arrangements 4, 4' and the thereto connected turbochargers 8, 8'.

According to embodiments, three cylinder arrangements 4, 4' of the six cylinder arrangements 4, 4' may be arranged to fire at an approximately 240 degrees crankcase angle separation interval.

According to further embodiments, the four stroke internal combustion engine may comprise a different number of cylinder arrangements 4, such as e.g. two, four, five, or eight cylinder arrangements 4.

This invention should not be construed as limited to the embodiments set forth herein. A person skilled in the art will realize that different features of the embodiments disclosed herein may be combined to create embodiments other than those described herein, without departing from the scope of the present invention, as defined by the appended claims. Although the invention has been described with reference to example embodiments, many different alterations, modifications and the like will become apparent for those skilled in the art. For instance, in the embodiments discussed in connection with FIGS. 1-5, at least one turbine in the form of a turbocharger has been discussed. Alternatively, the turbine may be a turbine connected to a crankshaft of the internal combustion engine, or a turbine connected to an electric generator. Therefore, it is to be understood that the foregoing is illustrative of various example embodiments and that the invention is defined only by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A four stroke internal combustion engine comprising:
an exhaust conduit;
a turbine comprising a turbine wheel, the turbine having a turbine wheel inlet area, $A_{TIN}$; and
a cylinder arrangement comprising:
a cylinder bore;
a piston arranged to reciprocate in the cylinder bore; and
an exhaust port arrangement, the exhaust port arrangement being configured to open and close an exhaust flow area, $A_{CYL}$, during an exhaust sequence of the piston reciprocation,
wherein the cylinder arrangement has a maximum volume, $V_{MAX}$, between a bottom dead center, BDC, of the piston and an upper inner delimiting surface of the combustion chamber,
wherein the exhaust conduit is located between the exhaust flow area, $A_{CYL}$, and the turbine wheel inlet area, $A_{TIN}$, and has an exhaust conduit volume, $V_{EXH}$, that is ≤0.5 times the maximum volume, $V_{MAX}$, of the cylinder arrangement,
wherein the turbine has a normalized effective flow area, $\gamma$, defined as $\gamma = A_{TURB}/V_{MAX}$, wherein $\gamma > 0.22$ m$^{-1}$, wherein $A_{TURB} = (A_{TIN}/A_{TOT})*m'_{RED}*(R/(\kappa(2/(\kappa+1)^X)))^{1/2}$, wherein $X=(\kappa+1)/(\kappa-1)$, wherein $A_{TOT}$ is a total inlet area of the turbine, and wherein $A_{TURB}$ is obtained at a reduced mass flow, $m'_{RED}$, of the turbine at 2.5-3.5 pressure ratio between an inlet side and an outlet side of the turbine and at a tip speed of 450 m/s of the turbine wheel, and
wherein the exhaust port arrangement is configured to expose the exhaust flow area, $A_{CYL}$, at a size of at least 0.22 times the maximum volume, $V_{MAX}$, of the cylinder arrangement when the piston is at the bottom dead center, BDC.

2. The four stroke internal combustion engine according to claim 1, wherein the value of the exhaust conduit volume, $V_{EXH}$, of the exhaust conduit located between the exhaust flow area, $A_{CYL}$, and the turbine wheel inlet area, $A_{TIN}$, does not include any volume of any conduit connected to the exhaust conduit via a connection having a minimum connection cross section area, $A_{CON}$, ≤0.022 times the maximum volume, $V_{MAX}$ of the cylinder arrangement.

3. The four stroke internal combustion engine according to claim 1, wherein the exhaust conduit comprises an inlet and an outlet for fluidly connecting the exhaust flow area, $A_{CYL}$, with the turbine wheel inlet area, $A_{TIN}$ and does not comprise any other inlets or outlets.

4. The four stroke internal combustion engine according to claim 1, wherein a momentary cylinder volume, V, of the cylinder arrangement is defined by a selected position of the piston in the cylinder bore during reciprocation of the cylinder and an upper inner delimiting surface of the combustion chamber,
wherein $A_{CYL}(V)$ expresses the exhaust flow area, $A_{CYL}$, as a function of the momentary cylinder volume, V, during a power stroke of the piston,
wherein an exhaust flow area coefficient, $\delta$, is defined as $\delta = A_{CYL}(V)/(0.22*V_{MAX})$, $A_{CYL}$ being expressed in m$^2$ and $V_{MAX}$ being expressed in m$^3$,
wherein the exhaust port arrangement has an opening speed coefficient, $\beta$, defined as $\beta = (V(\delta=1)-V(\delta=0.1))/V_{MAX}$, and
wherein the exhaust flow area, $A_{CYL}$, has an opening speed coefficient $\beta < 0.06$.

5. The four stroke internal combustion engine according to claim 1, wherein the turbine wheel is an axial turbine wheel.

6. The four stroke internal combustion engine according to claim 1, wherein the cylinder arrangement has a total swept volume, $V_S$, in the cylinder bore between the bottom dead center, BDC, and a top dead center, TDC, of the piston, and wherein $0.3 < V_S < 4$ liters.

7. A four stroke internal combustion engine comprising:
three cylinder arrangements;
an exhaust conduit arrangement; and
a turbine comprising a turbine wheel, the turbine having a turbine wheel inlet area, $A_{TIN}$,
wherein each of the cylinder arrangements comprises:
a combustion chamber;
a cylinder bore;
a piston arranged to reciprocate in the cylinder bore; and
an exhaust port arrangement configured to open and close an exhaust flow area, $A_{CYL}$, during an exhaust sequence of the piston reciprocation,
wherein the cylinder arrangement has a maximum volume, $V_{MAX}$ between a bottom dead center, BDC, of the piston and an upper inner delimiting surface of the combustion chamber,
wherein the exhaust conduit arrangement comprises three separate exhaust conduits, which each respectively fluidly connects a respective exhaust port arrangement of one of the cylinder arrangements with a separate portion of the turbine wheel inlet area, $A_{TIN}$, of the turbine, wherein each separate exhaust conduit has a separate exhaust conduit volume, $V_{EXH}$, that is ≤0.5 times a maximum volume, $V_{MAX}$, wherein the turbine has a normalized effective flow area, $\gamma$, defined as $\gamma = A_{TURB}/V_{MAX}$, wherein $\gamma > 0.22$ m$^{-1}$, wherein $A_{TURB} = (A_{TIN}/A_{TOT}) * m'_{RED} * (R/(\kappa(2/(\kappa+1)^X)))^{1/2}$, wherein $X = (\kappa+1)/(\kappa-1)$, wherein $A_{TOT}$ is a total inlet area of the turbine, and wherein $A_{TURB}$ is obtained at a reduced mass flow, $m'_{RED}$, of the turbine at 2.5-3.5 pressure ratio between an inlet side and an outlet side of the turbine and at a tip speed of 450 m/s of the turbine wheel, and wherein the exhaust port arrangement is configured to expose the exhaust flow area, $A_{CYL}$, at a size of at least 0.22 times the maximum volume, $V_{MAX}$, when the piston is at the bottom dead center, BDC.

8. The four stroke internal combustion engine according to claim 7, wherein each of the three cylinder arrangements is arranged to fire at an 240-degree crankshaft angle separation interval.

9. The four stroke internal combustion engine according to claim 7, wherein each of the three cylinder arrangements has an opening speed coefficient $\beta < 0.06$.

* * * * *

UNITED STATES PATENT AND TRADEMARK OFFICE
CERTIFICATE OF CORRECTION

PATENT NO. : 11,008,933 B2
APPLICATION NO. : 15/772441
DATED : May 18, 2021
INVENTOR(S) : Eric Olofsson et al.

Page 1 of 1

It is certified that error appears in the above-identified patent and that said Letters Patent is hereby corrected as shown below:

In the Claims

In Column 11, Claim 1, please change Line 41 to read:
"a combustion chamber; a cylinder bore;"

Signed and Sealed this
First Day of November, 2022

Katherine Kelly Vidal
*Director of the United States Patent and Trademark Office*